July 14, 1959  E. A. PETERSON ET AL  2,895,035
HEAT SEALING ELECTRODE DIE
Filed April 4, 1957  2 Sheets-Sheet 1

Inventors
EVERETT A. PETERSON
HAROLD W. PETERSON
By Hill, Sherman, Meroni, Gross & Simpson
Attys July 14, 1959  E. A. PETERSON ET AL  2,895,035
HEAT SEALING ELECTRODE DIE
Filed April 4, 1957  2 Sheets-Sheet 2
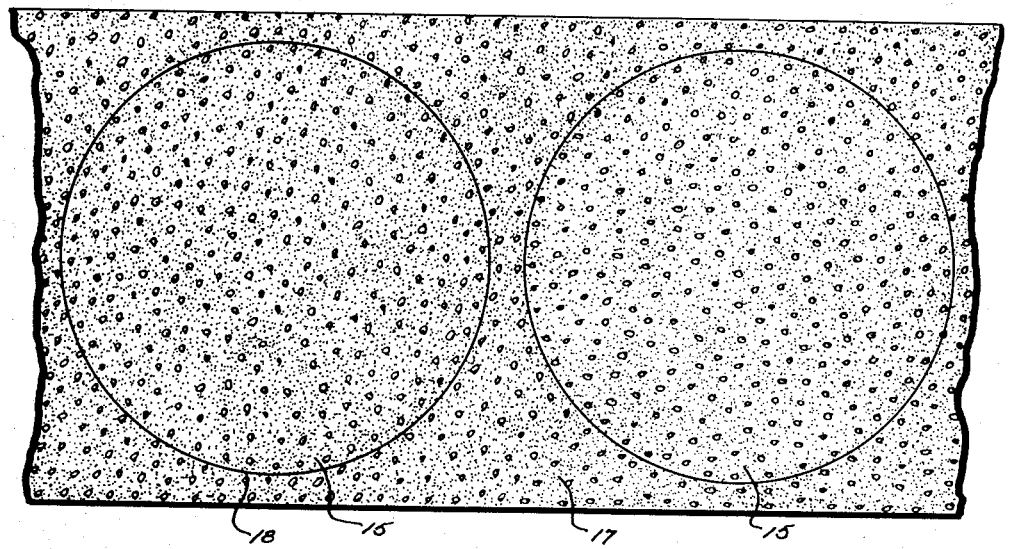
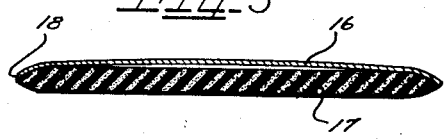
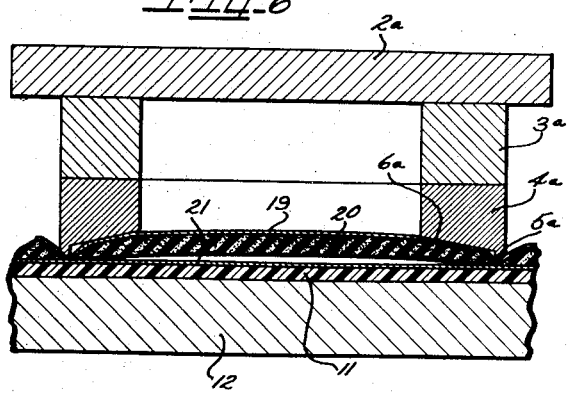
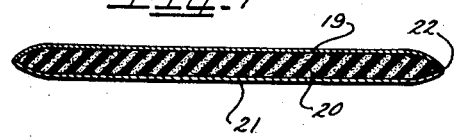
Inventors
EVERETT A. PETERSON
HAROLD W. PETERSON
By Hill, Sherman, Meroni, Gross & Simpson
Attys

United States Patent Office 2,895,035
Patented July 14, 1959

2,895,035

HEAT SEALING ELECTRODE DIE

Everett A. Peterson, Roslyn Heights, and
Harold W. Peterson, Roslyn, N.Y.

Application April 4, 1957, Serial No. 650,730

1 Claim. (Cl. 219—10.53)

This invention relates to improvements in a heat sealing electrode die, and more particularly to an electrode die highly desirable for heat sealing by means of high frequency electric current for securing together thermoplastic laminations in substantially any desired configuration or contour, the invention being highly desirable for use in the making of various and sundry devices including bath mats, cushions, chair and stool pads, apparel paddings of various types, numerous medical and surgical as well as industrial cushioning, shock absorbing and supporting devices and miscellaneous other articles embodying a heat sealed connection, all as will be apparent to one skilled in the art.

In the past, many and various types of electrode dies for heat sealing purposes, and particularly with regard to electronic heat sealing, have been provided. These formerly known dies, however, were in many cases not capable of providing simultaneously a heat sealing seam and also a substantial severance of the desired article from the work material. Further, formerly known dies of the character of the instant invention were such that when used upon relatively light weight material they provided a heat sealed connection in the form of an outstanding flange at the boundry of the resulting article, which flange presented an objectionably abrupt edge, or a bad fit or objectionable bulge particularly when the resultant article was to be associated or interfitted with some other device, such as would be the case with a stool pad, for example. Heretofore, it was substantially impossible to obtain a heat sealed seam disposed at the very bounding edge of the resultant article so as to give the visual appearance of the elimination of any external projection from that bounding edge, and particularly where laminations forming the resultant article were secured together at the very bounding edges. Also, it was substantially impossible, with die means heretofore known, to provide such a heat seal and at the same time graduate the effect of the heat seal so that one of the laminations of the resultant article, and usually a thicker lamination, could be provided with a curvate marginal portion gradually decreasing in thickness toward the heat sealed seam so as to provide a smooth contour to the finished article, even though that thicker lamination was initially flat prior to the heat sealing operation. It might further be mentioned that with electrode dies of the character heretofore known, several operations would be necessary to provide a laminated device with a very sharp clean cut bounding edge, substantially sever the device from the stock work sheets, and also to contour the device in the desired manner.

With the foregoing in mind, it is an important object of the instant invention to provide a heat sealing electrode die so shaped and contoured as to simultaneously heat seal a plurality of laminations together and to substantially sever the resultant article from the stock sheets.

Another object of the instant invention is the provision of a heat sealing electrode die capable of providing a graduated heat seal.

Also a feature of the instant invention is the provision of a heat sealing electrode die having a heat sealing face gradually sloping away from substantially a knife-edge formation, whereby the knife-edge establishes a positive heat seal seam, and the sloping face thereadjacent contours one face of the resultant article.

Another feature of the instant invention resides in the provision of a heat sealing electrode die for heat sealing a plurality of thermoplastic laminations together, one of the laminations being materially thicker than the remainder, and the die being so shaped on its heat sealing face as to not only provide a positive heat sealed seam around the bounding edge of the resultant article, but also to graduate the effect of that heat seal so as to contour the thicker lamination inwardly of the heat sealed seam.

A further object of the instant invention is the provision of a heat sealing electrode die having a heat sealing face so contoured as to effectively unite a relatively thick thermoplastic lamination with one or more other laminations, define the resultant article, and provide a very sharp heat seal seam at the very bounding edge of the resultant article, while at the same time graduating the effect of the heat seal on the relatively thick lamination to provide the same with a rounded margin gradually decreasing in thickness toward the heat sealed seam.

Still another object of the instant invention is the provision of a heat sealing electrode die so constructed that in one operation the die is capable of establishing an extremely fine bounding edge heat sealed seam, substantially sever the resultant article from stock material, and graduate the effect of the heat seal inwardly of the seam to contour one or more of the laminations making up the resultant article.

It is also an object of the instant invention to provide a heat sealing electrode die that is extremely long lived, economical to manufacture, and which performs in a single operation results heretofore requiring several operations to accomplish.

While some of the more salient features, characteristics and advantages of the instant invention have been above pointed out, others will become apparent from the following disclosures, taken in conjunction with the accompanying drawing, in which:

Figure 4 is a fragmentary plan view, similar in character to Figure 2, illustrating laminations of material upon which an electrode die of different configuration but embodying principles of the instant invention may operate;

Figure 5 is a transverse cross-sectional view through one of the finished articles made as indicated in Figure 4;

Figure 6 is a fragmentary vertical sectional view of the same character as of Figure 3, illustrating the use of a die capable of forming the structure shown in Figures 4 and 5, but showing the same acting upon a different series of laminations; and Figure 7 is a vertical cross-sectional view of one of the articles produced by the die seen in Figure 6.

As shown on the drawings:

With heat sealing dies, of the character embodying principles of the instant invention, it will be understood that the same general die construction is embodied throughout, and otherwise a die is merely shaped or contoured to provide a heat sealed article of corresponding shape or contour. It will also be understood that the instant invention is equally effective on two or more laminations of the material, or upon two laminations and one or more partial laminations, and in various other manners as will be apparent to one skilled in the art.

Further, the instant invention is designed for use in a press with which high frequency electronic heat sealing equipment is associated, the die functioning as one of the electrodes, and being subjected during the heat sealing operation to the necessary amount of pressure to accomplish the desired result.

Figure 1:
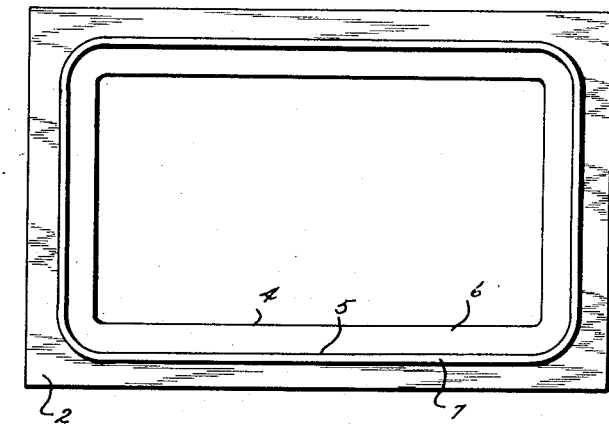
Figure 1 is a plan view of the working face of the heat sealing electrode die embodying principles of the instant invention.
Figure 2:
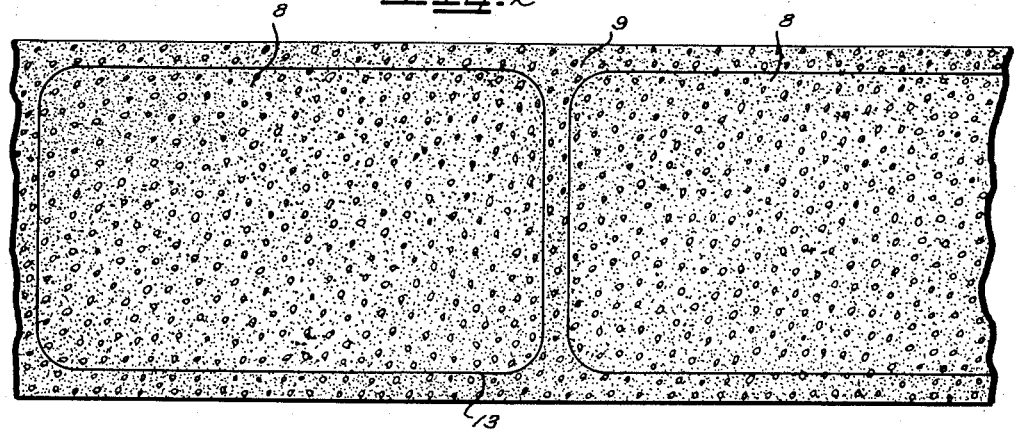
Figure 2 is a fragmentary plan view of laminations of stock material illustrating one use of the die seen in Figure 1.
Figure 3:
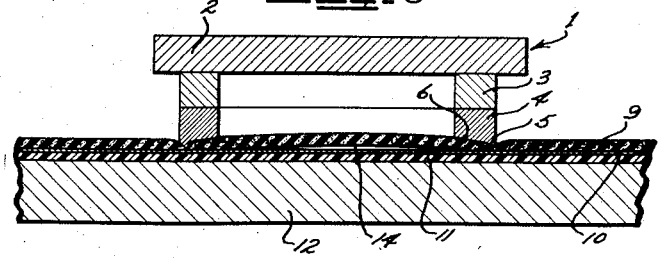
Figure 3 is a reduced fragmentary vertical sectional view illustrating the die of Figure 1 in operation upon the stock material of Figure 2.

By way of example, and not by way of limitation, the first illustrated embodiment of the instant invention, seen in Figures 1, 2 and 3, is an electrode die assemly generally indicated by numeral 1, and shaped to form a generally rectangular object, such for example as a bath mat. The die assembly comprises a base 2 of any suitable shape for ready mounting in the press, and which base is preferably in the form of a metallic plate, steel being satisfactory, and there may or may not be a pillow block 3 interposed between the base and the die proper depending upon the depth desired. The die proper indicated by numeral 4 is preferably of brass or equivalent electrically conductive material, and is given an outline which is the image of the resultant article. The die is shaped to provide substantially a knife-edge 5 and inwardly thereof the die is provided with a face 6 sloping gradually away from the knife edge. On the outer side of the knife edge there is an abrupt slope 7 at a far greater angle than the face 6. In the illustrated instance, the face 6 slopes inwardly from the knife-edge toward the base of the die assembly, and the slope is sufficiently gradual that the effect of the high frequency current concentrated at the knife edge is graduated along the slope of the face partially thereacross and in a progressively decreasing manner. This shaping of the die aids in providing an actual heat seal of a distinctive character in that one of the laminations is given a definite contour adjacent the seam of the heat seal.

By way of example, the illustrated die assembly is shaped to produce an element such as a bath mat 8. The mat is preferably laminated and formed from a thick cushioning lamination 9 and a thin lamination 10. The sheet or lamination 9 is preferably a thermoplastic foam having intercommunicating cells. Many thermoplastic materials are suitable for this purpose, but by way of example, it may be mentioned that a vinyl foam made from a liquid composition generically known as a plastisol which itself may be a dispersion or suspension of polyvinyl chloride resin or a coploymer in one or more plasticizers, is quite satisfactory. The plasticizer used may be selected from a large number of high boiling esters such as dioctyl phthalate, dioctyl adipate, dicapryl phthalate etc. The plastisol is expanded, such as by an inert gas, and then cured while wet to form an open cellular, flexible, structural material. The lamination 10 may be of the same chemical constituency, but is made without expansion, and preferably rolled on a calender, and is in the nature of a thin sheet or film of considerably greater density than the foam layer.

As illustrated in Figure 3, the die may be brought down upon the laminations, and if so desired a buffer 11 of any suitable dielectric material, such for example as a phenolic condensation product, may be disposed between the lamination 10 and a second electrode such as a metallic plate 12. When the die assembly is energized with high frequency current, there will be a heat sealed seam 13 established by the melting and fusing of the thermoplastic laminations, this seam defining the resultant article. The seam is such as to substantially sever the article from the sheet stock, it being a simple expedient to free the bath mat from the waste stock by hand.

As the die completes its stroke during the heat sealing operation, there is a graduated effect of the heat seal transferred over the sloping face 6 of the die, so that the lamination 9 is given a definite curvate marginal portion as seen in Figure 3 inside the heat seal seam. This curvate margin gradually decreases in thickness toward the seam, and the seam itself will be an extremely fine one at the very edge of the bath mat, and there should be no projecting flange around the seam or incorporated in it. When the bath mat is placed upon the floor, the curvate margin eliminates any abrupt edge, not only giving the mat a smooth contoured pleasing appearance, but also rendering it easy to step upon with no discomfort to the user. As shown in exaggerated style in Figure 3, the laminations are preferably only secured together at the very bounding edges, and consequently will be free from each other in the interior of the mat, there being a space 14 illustrated to indicate that freedom from each other. Consequently, the bath mat will dry in a very short time after being wetted, the drying being aided by the intercellular communication.

It will thus be seen that with the die of the instant invention, in one single simple operation, the resultant article is not only defined, secured by sharp edge heat seal, substantially severed from the stock material, but has also contoured at least one of the laminations going to make up the resultant article.

In Figures 4 and 5 we have illustrated a stool pad 15 which may be made by way of the die seen in Figure 6, to be later described. The operation is the same and in this instance the stool pad is made up of a top lamination 16 of the same character as the lamination 10 above described, and a bottom cushioning lamination 17 which also may be thermoplastic foam. In this instance, the die has been used with the lamination 16 uppermost to establish a heat seal seam 18, the structure being shown inverted in Figure 4. It will be noted that the seam 18 is at the very bounding edge of the resultant pad, the laminations are otherwise not secured to each other, and the marginal portion of the pad is given the curvate contour on both sides, so that when the pad is placed upon a stool it will lie flatly and securely in position with no abrupt edge to cause discomfort to the user.

In Figures 6 and 7 we have shown another form of stool pad or seat cushion wherein three laminations are utilized consisting of a top lamination 19, an intermediate cushioning lamination 20, and a bottom lamination 21. The top and bottom laminations 19 and 21 may be thermoplastic film, while the cushioning lamination 20 may be thermoplastic foam.

The die used is substantially the same as that disclosed in Figure 3, but obviously has a different shape, in this instance being round. The die comprises a base 2a, a pillow 3a, and the die element 4a equipped with a knife-edge 5a, and the sloping face 6a just inside of the knife-edge. The die is utilized in the same fashion to heat seal three laminations together, as explained above for the sealing of two laminations and the resultant article will have a heat sealed seam 22 at the very bounding edge joining all three laminations as seen in Figure 7. Again, the marginal portions of the resultant cushion are contoured to give a curvate shape adjacent the head sealed seam on both sides of the pad.

As stated above, various other devices may be made from dies embodying principles of the instant invention, such as bandages, dressings, foot cushioning and supporting devices including insoles, and numerous other devices, utilizing as many full and partial laminations as may be desired in the resultant article.

From the foregoing, it is apparent that we have provided a simple form of electrode die, economical to both make and use, and which performs a number of operations in a single movement. It will be understood that modifications and variations may be effected without departing from the scope of the novel concepts of the present invention.

We claim as our invention:

An electrode die for electronic heat sealing of thermoplastic laminations of which one lamination is materially thicker and softer than the remainder, comprising a base, a die element of electrically conductive material carried by said base, a knife edge depending from said die element sufficiently to confine the resultant heat seal seam joining the laminations to a sharp line at the knife edge, said knife edge being shaped to define the complete heat seal seam and thus the bounding edge of the article being made, and a marginal face on said die element inside and above said knife edge and gradually sloping inwardly away from said knife edge, the slope and location of said face being such as to shape the margin of the thicker lamination so that it decreases in thickness toward said knife edge and the resultant sharp heat seal seam but remains free from any other lamination inside the seam.

References Cited in the file of this patent

UNITED STATES PATENTS

| | | |
|---|---|---|
| 2,631,646 | Gannon et al. | Mar. 17, 1953 |
| 2,638,963 | Frederick et al. | May 19, 1953 |
| 2,681,296 | Dobbs et al. | June 15, 1954 |
| 2,686,556 | Gerber et al. | Aug. 17, 1954 |